United States Patent
Shatsky et al.

(10) Patent No.: US 11,249,654 B2
(45) Date of Patent: Feb. 15, 2022

(54) STORAGE SYSTEM WITH EFFICIENT DATA AND PARITY DISTRIBUTION ACROSS MIXED-CAPACITY STORAGE DEVICES

(71) Applicant: EMC IP Holding Company LLC, Hopkinton, MA (US)

(72) Inventors: Yosef Shatsky, Karnei Shomron (IL); Rivka Matosevich, Zichron Ya'acov (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 16/793,163

(22) Filed: Feb. 18, 2020

(65) Prior Publication Data

US 2021/0255782 A1   Aug. 19, 2021

(51) Int. Cl.
   *G06F 3/06* (2006.01)

(52) U.S. Cl.
   CPC ........... *G06F 3/0619* (2013.01); *G06F 3/064* (2013.01); *G06F 3/0689* (2013.01)

(58) Field of Classification Search
   None
   See application file for complete search history.

(56) References Cited

U.S. PATENT DOCUMENTS 5,754,756 A * 5/1998 Watanabe ............ G06F 11/1076
                                                  711/114
5,845,319 A * 12/1998 Yorimitsu ............. G06F 3/0644
                                                  711/114

(Continued)

FOREIGN PATENT DOCUMENTS

WO           2016111954 A1   7/2016
WO  PCT/US2019/024885        1/2020
WO  PCT/US2019/024900        1/2020

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Michael Alsip
(74) *Attorney, Agent, or Firm* — Ryan, Mason & Lewis, LLP

(57) ABSTRACT

A storage system comprises mixed-capacity storage devices, including at least one or more storage devices having relatively low capacities and one or more storage devices having relatively high capacities. The storage system is configured to establish a redundant array of independent disks (RAID) arrangement comprising a plurality of stripes, with each of the plurality of stripes comprising a plurality of data blocks and one or more corresponding parity blocks, the data blocks and parity blocks being distributed across multiple ones of the storage devices. In conjunction with establishment of the RAID arrangement, the storage system is further configured to concentrate storage of the parity blocks in the one or more storage devices having the relatively high capacities. The storage devices in some embodiments comprise at least a first set of storage devices each having a first capacity and a second set of storage devices each having a second capacity higher than the first capacity.

20 Claims, 6 Drawing Sheets

(56) References Cited

U.S. PATENT DOCUMENTS

| | | | |
|---|---|---|---|
| 7,165,155 | B1 | 1/2007 | Duprey et al. |
| 7,440,982 | B2 | 10/2008 | Lu et al. |
| 7,444,464 | B2 | 10/2008 | Urmston et al. |
| 8,095,726 | B1 | 1/2012 | O'Connell et al. |
| 8,214,612 | B1 | 7/2012 | Natanzon |
| 8,301,593 | B2 | 10/2012 | Hoffmann et al. |
| 8,335,899 | B1 | 12/2012 | Meiri et al. |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0050012 | A1* | 2/2010 | Nonaka ............... G06F 11/1662 714/5.1 |
| 2010/0179941 | A1 | 7/2010 | Agrawal et al. |
| 2011/0022566 | A1 | 1/2011 | Beaverson et al. |
| 2011/0225123 | A1 | 9/2011 | D'Souza et al. |
| 2012/0124282 | A1 | 5/2012 | Frank et al. |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2015/0378766 | A1 | 12/2015 | Beveridge et al. |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185529 | A1 | 6/2017 | Chhabra et al. |
| 2017/0192857 | A1 | 7/2017 | Meiri et al. |
| 2018/0095873 | A1 | 4/2018 | Nakagoe et al. |
| 2019/0205053 | A1* | 7/2019 | Nomura ................ G06F 3/0689 |
| 2019/0303490 | A1 | 10/2019 | Chen et al. |
| 2019/0392060 | A1 | 12/2019 | Meiri et al. |
| 2020/0026616 | A1 | 1/2020 | Hu et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al. Jul. 28, 2017, and entitled "Token-Based Data Flow Control in a Clustered Storage System."

U.S. Appl. No. 15/793,121 filed in the name of David Meiri et al. Oct. 25, 2017, and entitled "Opportunistic Compression of Replicated Data in a Content Addressable Storage System."

U.S. Appl. No. 15/824,536 filed in the name of Christopher Sayles et al. Nov. 28, 2017, and entitled "Storage System with Asynchronous Messaging between Processing Modules for Data Replication."

U.S. Appl. No. 16/253,793 filed in the name of Yuval Harduf et al. Jan. 22, 2019, and entitled "Storage System with Data Consistency Checking in Synchronous Replication Using Active Snapshot Set."

U.S. Appl. No. 16/265,131 filed in the name of Lior Kamran et al. Feb. 1, 2019, and entitled "Storage System with Write Cache Release Protection."

U.S. Appl. No. 16/343,942 filed in the name of Yonatan Shtarkman et al. Apr. 22, 2019, and entitled "Snapshot-Enabled Storage System Implementing Algorithm for Efficient Reclamation of Snapshot Storage Space."

U.S. Appl. No. 16/343,949 filed in the name of Asaf Porath et al. Apr. 22, 2019, and entitled "Snapshot-Enabled Storage System Implementing Algorithm for Efficient Reading of Data from Stored Snapshots."

U.S. Appl. No. 16/396,897 filed in the name of Anton Kucherov et al. Apr. 29, 2019, and entitled "Storage System with Deduplication-Aware Replication Implemented Using a Standard Storage Command Protocol."

U.S. Appl. No. 16/413,050 filed in the name of Xiangping Chen et al. May 15, 2019, and entitled "Storage System with Coordinated Recovery across Multiple Input-Output Journals of Different Types."

U.S. Appl. No. 16/663,524 filed in the name of Xiangping Chen et al. Oct. 25, 2019, and entitled "Storage System with Throughput-Based Timing of Synchronous Replication Recovery."

U.S. Appl. No. 16/665,651 filed in the name of Lior Kamran et al. Oct. 28, 2019, and entitled "Recovery Flow with Reduced Address Lock Contention in a Content Addressable Storage System."

U.S. Appl. No. 16/166,397 filed in the name of Nimrod Shani et al. Oct. 22, 2018, and entitled "Storage System with Data Integrity Verification Performed in Conjunction with Internal Data Movement."

U.S. Appl. No. 16/446,138 filed in the name of William F. Moore et al. Jun. 19, 2019, and entitled "Prefill of Raid Stripes in a Storage System by Reading of Existing Data."

U.S. Appl. No. 16/446,161 filed in the name of William F. Moore et al. Jun. 19, 2019, and entitled "Automatic Prefill of a Storage System with Conditioning of Raid Stripes."

U.S. Appl. No. 16/446,183 filed in the name of Wiliam F. Moore et al. Jun. 19, 2019, and entitled "Distributed Generation of Random Data in a Storage System."

U.S. Appl. No. 16/530,121 filed in the name of Anton Kucherov et al. Aug. 2, 2019, and entitled "Memory-Efficient Processing of Raid Metadata Bitmaps."

(56) References Cited

OTHER PUBLICATIONS

U.S. Appl. No. 16/671,824 filed in the name of Lior Kamran et al. Nov. 1, 2019, and entitled "Storage System Capacity Expansion Using Mixed-Capacity Storage Devices."
U.S. Appl. No. 16/693,858 filed in the name of Doron Tal Nov. 25, 2019, and entitled "Storage System with Prioritized RAID Rebuild."

* cited by examiner

| Scenario | Rotation | Data balancing |
|---|---|---|
| n=4 k=3<br>Devices<br>1. 4GB<br>2. 4GB<br>3. 6GB<br>4. 6GB | Performance utilization: 83%<br>Data on each device<br>1. 3GB<br>2. 3GB<br>3. 4.5GB<br>4. 4.5GB | Performance utilization: 100%<br>Data on each device<br>1. 3.75GB<br>2. 3.75GB<br>3. 3.75GB<br>4. 3.75GB |
| n=4 k=3<br>Devices<br>1. 4GB<br>2. 4GB<br>3. 8GB<br>4. 8GB | Performance utilization: 75%<br>Data on each device<br>1. 3GB<br>5. 3GB<br>6. 6GB<br>7. 6GB | Performance utilization: 90%<br>Data on each device<br>1. 4GB<br>5. 4GB<br>6. 5GB<br>7. 5GB |
| n=6 k=4<br>Devices<br>1. 4GB<br>2. 4GB<br>3. 4GB<br>4. 8GB<br>5. 8GB<br>6. 8GB | Performance utilization: 41.67%<br>Data on each device<br>1. 2.67GB<br>2. 2.67GB<br>3. 2.67GB<br>4. 5.33GB<br>5. 5.33GB<br>6. 5.33GB | Performance utilization: 100%<br>Data on each device<br>1. 4GB<br>2. 4GB<br>3. 4GB<br>4. 4GB<br>5. 4GB<br>6. 4GB |

FIG. 4

STORAGE SYSTEM WITH EFFICIENT DATA AND PARITY DISTRIBUTION ACROSS MIXED-CAPACITY STORAGE DEVICES

FIELD

The field relates generally to information processing systems, and more particularly to storage in information processing systems.

BACKGROUND

In many storage systems, data is distributed across multiple storage devices in accordance with redundant array of independent disks (RAID) arrangements. Some RAID arrangements allow a certain amount of lost data to be rebuilt using parity information, typically in response to a storage device failure or other type of failure within the storage system. For example, a RAID 6 arrangement uses "dual parity" and can recover from simultaneous failure of two storage devices of the storage system. These and other RAID arrangements provide redundancy for stored data, with different types of RAID arrangements providing different levels of redundancy. Storage systems that utilize such RAID arrangements are typically configured to perform a rebuild process after detection of a storage device failure, and once the rebuild process is completed, the storage system can sustain additional failures. Conventional RAID techniques of this type can be problematic, in that such techniques are usually tailored to storage systems in which all of the storage devices over which the data is distributed have the same storage capacity. Adapting such techniques to storage systems with mixed-capacity storage devices can cause bottlenecks on particular storage devices, leading to degraded read performance as well as undue lengthening of the duration of the rebuild process. For example, one or more higher-capacity storage devices may be overutilized, and one or more lower-capacity storage devices may be underutilized, with the resulting utilization imbalance across the storage devices adversely impacting overall storage system performance.

SUMMARY

Illustrative embodiments provide techniques for efficient parity and data distribution for RAID arrangements utilizing mixed-capacity storage devices in a storage system. For example, some embodiments provide RAID arrangements in which data blocks of RAID stripes are allocated to storage devices in a manner that balances the amount of data across both lower-capacity and higher-capacity storage devices, while parity blocks are concentrated on the higher-capacity storage devices using their respective remaining capacities not already allocated for data blocks. These and other embodiments can include any desired arrangement of multiple storage devices of different capacities, and are not limited to particular numbers of devices or particular different capacities.

Such arrangements illustratively place the same or similar amounts of data on each of the storage devices, including both lower-capacity and higher-capacity storage devices, while using the higher-capacity storage devices to hold all or most of the parity blocks. The lower-capacity storage devices may therefore contain no parity blocks, or only a relatively small number of parity blocks. These and other embodiments can thereby alleviate bottlenecks that might otherwise arise at the higher-capacity storage devices, leading to improved read performance and reduced rebuild time. For example, overloading of higher-capacity devices is avoided, resulting in higher overall performance utilization across all of the devices.

References herein to "mixed-capacity storage devices" should be more generally understood to encompass arrangements that include multiple storage devices of at least two different storage capacities, such as, for example, a first set of storage devices each having the same first capacity, and at least a second set of storage devices each having a second capacity higher than the first capacity. Illustrative embodiments can therefore include more than two sets of storage devices, such as three, four or more different sets of storage devices, with the storage devices of a given such set each having a storage capacity that is different than that of the storage devices of the other sets. One or more of such sets can alternatively include only a single storage device rather than multiple storage devices. Accordingly, the number of different capacities in the mixed-capacity storage devices of a storage system can be as many as the number of storage devices of that system, as in an arrangement in which each storage device has a different capacity than all of the other storage devices.

In one embodiment, a storage system comprises a plurality of storage devices, with the storage devices comprising at least one or more storage devices having relatively low capacities and one or more storage devices having relatively high capacities. Additional storage devices of various other capacities may also be present in some embodiments.

The storage system is further configured to establish a RAID arrangement comprising a plurality of stripes, with each of the plurality of stripes comprising a plurality of data blocks and one or more corresponding parity blocks, the data blocks and parity blocks being distributed across multiple ones of the storage devices, and in conjunction with establishment of the RAID arrangement, to concentrate storage of the parity blocks in the one or more storage devices having the relatively high capacities.

As indicated above, the storage devices in some embodiments comprise at least a first set of storage devices each having a first capacity and a second set of storage devices each having a second capacity higher than the first capacity. In one or more such embodiments, concentrating storage of the parity blocks in the one or more storage devices having the relatively high capacities illustratively comprises concentrating storage of the parity blocks in the second set of storage devices each having the second capacity higher than the first capacity.

For example, concentrating storage of the parity blocks in the second set of storage devices in some embodiments comprises storing the parity blocks exclusively in the second set of storage devices, such that none of the parity blocks are stored in the first set of storage devices.

As another example, concentrating storage of the parity blocks in the second set of storage devices illustratively comprises storing the parity blocks such that the storage devices of the first set each have a lower ratio of number of parity blocks to number of data blocks than the storage devices of the second set.

In some embodiments, the same number of data blocks are stored in each of the storage devices of the first and second sets of storage devices. Other types of data balancing can be used in other embodiments.

The storage system in some embodiments is implemented as a distributed storage system comprising a plurality of storage nodes, each storing data in accordance with a designated RAID arrangement, although it is to be appreciated that a wide variety of other types of storage systems can be used in other embodiments.

These and other illustrative embodiments include, without limitation, apparatus, systems, methods and processor-readable storage media.

BRIEF DESCRIPTION OF THE DRAWINGS

FIG. 4 shows a table providing additional examples of different data and parity distributions across different sets of mixed-capacity storage devices.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
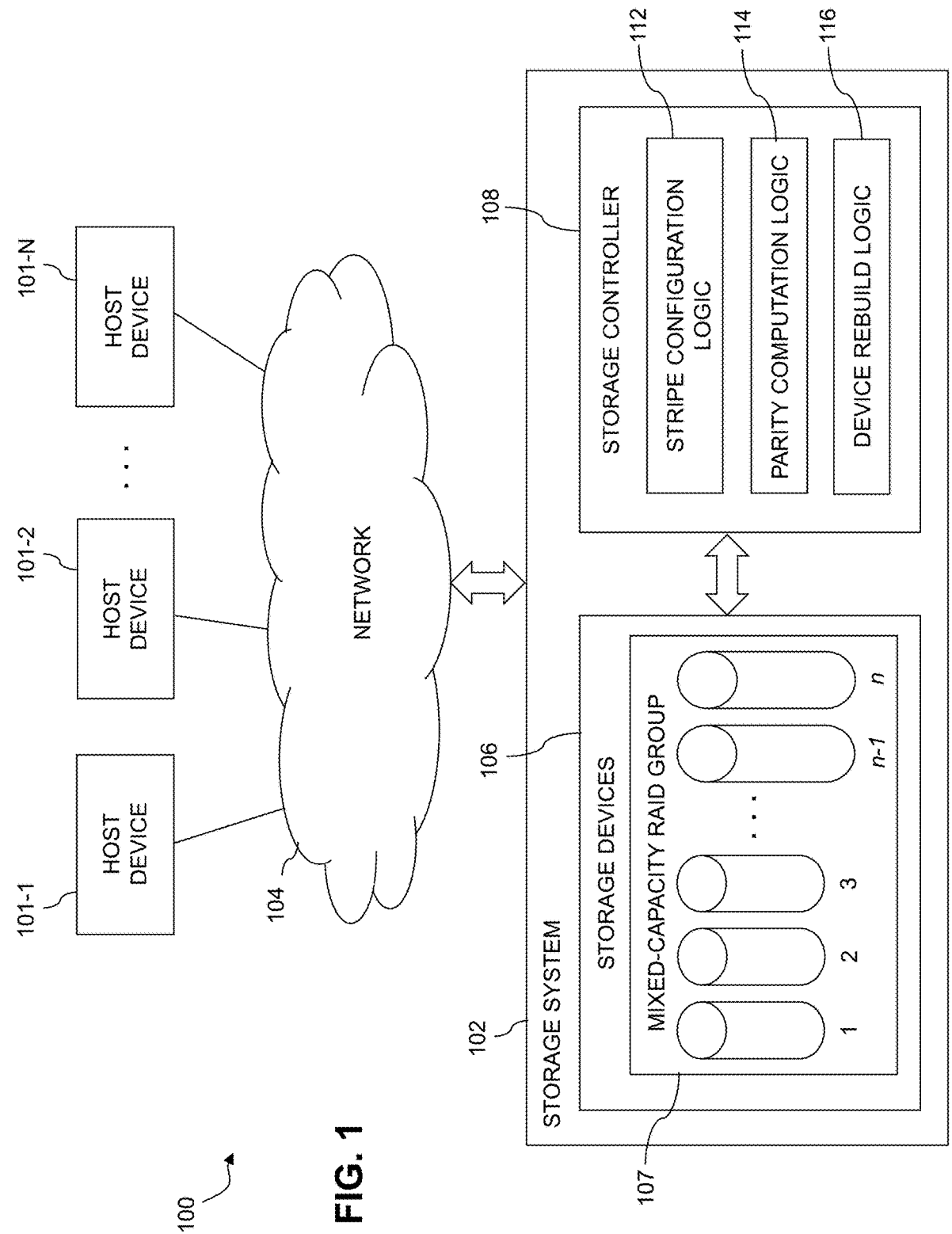
FIG. 1 is a block diagram of an information processing system comprising a storage system incorporating efficient data and parity distribution across mixed-capacity storage devices in an illustrative embodiment

FIG. 1 shows an information processing system 100 configured in accordance with an illustrative embodiment. The information processing system 100 comprises a plurality of host devices 101-1, 101-2, . . . 101-N, collectively referred to herein as host devices 101, and a storage system 102. The host devices 101 are configured to communicate with the storage system 102 over a network 104.

The host devices 101 illustratively comprise servers or other types of computers of an enterprise computer system, cloud-based computer system or other arrangement of multiple compute nodes associated with one or more users.

For example, the host devices 101 in some embodiments illustratively provide compute services such as execution of one or more applications on behalf of each of one or more users associated with respective ones of the host devices. Such applications illustratively generate input-output (IO) operations that are processed by the storage system 102. The term "input-output" as used herein refers to at least one of input and output. For example, IO operations may comprise write requests and/or read requests directed to logical addresses of one or more logical storage volumes of the storage system 102. These and other types of IO operations are also generally referred to herein as IO requests.

The storage system 102 illustratively comprises processing devices of one or more processing platforms. For example, the storage system 102 can comprise one or more processing devices each having a processor and a memory, possibly implementing virtual machines and/or containers, although numerous other configurations are possible.

The storage system 102 can additionally or alternatively be part of cloud infrastructure such as an Amazon Web Services (AWS) system. Other examples of cloud-based systems that can be used to provide at least portions of the storage system 102 include Google Cloud Platform (GCP) and Microsoft Azure.

The host devices 101 and the storage system 102 may be implemented on a common processing platform, or on separate processing platforms. The host devices 101 are illustratively configured to write data to and read data from the storage system 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 102 comprises a plurality of storage devices 106 configured to store data of a plurality of storage volumes. The storage volumes illustratively comprise respective logical units (LUNs) or other types of logical storage volumes. The term "storage volume" as used herein is intended to be broadly construed, and should not be viewed as being limited to any particular format or configuration.

References to "disks" in this embodiment and others disclosed herein are intended to be broadly construed, and are not limited to hard disk drives (HDDs) or other rotational media. For example, at least portions of the storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, HDDs can be used in combination with or in place of SSDs or other types of NVM devices in the storage system 102.

It is therefore to be appreciated numerous different types of storage devices 106 can be used in storage system 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, the storage system 102 illustratively comprises a scale-out all-flash distributed content addressable storage (CAS) system, such as an XtremIO™ storage array from Dell EMC of Hopkinton, Mass. A wide variety of other types of distributed or non-distributed storage arrays can be used in implementing the storage system 102 in other embodiments, including by way of example one or more VNX®, VMAX®, Unity™ or PowerMax™ storage arrays, commercially available from Dell EMC. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

In some embodiments, communications between the host devices 101 and the storage system 102 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with the storage system 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The host devices 101 are configured to interact over the network 104 with the storage system 102. Such interaction illustratively includes generating IO operations, such as write and read requests, and sending such requests over the network 104 for processing by the storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell EMC. Other types of MPIO drivers from other driver vendors may be used.

The storage system 102 in this embodiment stores data across the storage devices 106 in accordance with at least one RAID arrangement 107 involving multiple ones of the storage devices 106. The RAID arrangement 107 in the present embodiment illustratively comprises at least one RAID group that includes mixed-capacity storage devices, such as one or more storage devices having relatively low capacities and one or more storage devices having relatively high capacities.

Such a RAID group is also referred to herein as a mixed-capacity RAID group. There may be multiple distinct RAID groups within the storage system 102, each involving a different subset of the storage devices 106. The term "RAID group" as used herein is intended to be broadly construed, so as to encompass, for example, a set of storage devices that are part of a given RAID arrangement, such as at least a subset of the storage devices 106 that are part of the RAID arrangement 107. A given such RAID group comprises a plurality of stripes, each containing multiple stripe portions distributed over multiple ones of the storage devices 106 that are part of the RAID group.

In the particular illustrative RAID arrangement 107 shown in the figure, the example mixed-capacity RAID group more specifically comprises a subset of the storage devices 106 that includes n of the storage devices 106 individually denoted 1 through n, respectively, with at least storage devices 1, 2 and 3 having relatively low capacities, relative to other storage devices 106 in the mixed-capacity RAID group, and at least storage devices n−1 and n having relatively high capacities, relative to other storage devices 106 in the mixed-capacity RAID group. For example, the storage devices 1, 2 and 3 may comprise respective SSDs each having a 500 GigaByte (GB) capacity, while the storage devices n–1 and n comprise higher-capacity storage devices such as 1 TeraByte (TB) SSDs, although these and other particular relative storage device capacities referred to herein should not be viewed as limiting in any way. Accordingly, terms such as "relatively high" and "relatively low" as used herein with respect to mixed-capacity storage devices are intended to be broadly construed, and to indicate a substantial difference in capacities, such as a capacity difference of about 10% or more between two devices. Larger capacity differences may additionally or alternatively be present, such as the capacity difference between the 500 GB and 1 TB devices noted above, and other capacity differences between respective pairs of devices in other embodiments herein. The terms "relatively high" and "relatively low" should therefore not be construed as requiring any particular capacity levels, but are instead relative terms, indicating a substantial difference in capacities between at least two different devices, relative to one another, as described above.

Numerous other arrangements of mixed-capacity storage devices can be used in RAID arrangement 107 in other embodiments. References herein to "mixed-capacity storage devices" are therefore intended to be broadly construed, so as to encompass arrangements that include multiple storage devices of at least two different storage capacities, such as, for example, a first set of storage devices each having the same first capacity, and at least a second set of storage devices each having a second capacity higher than the first capacity. Illustrative embodiments can therefore include more than two sets of storage devices, such as three, four or more different sets of storage devices, with the storage devices of a given such set each having a storage capacity that is different than that of the storage devices of the other sets. One or more of such sets can alternatively include only a single storage device rather than multiple storage devices.

Accordingly, the number of different capacities in the mixed-capacity storage devices 106 of storage system 102 can be as many as the number of storage devices 106 of that system, as in an arrangement in which each of the storage devices 106 has a different capacity than all of the other ones of the storage devices 106.

The RAID arrangement 107 can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The RAID arrangement 107 is established by a storage controller 108 of the storage system 102. The storage devices 106 in the context of the RAID arrangement 107 and other RAID arrangements herein are also referred to as "disks" or "drives." A given such RAID arrangement may also be referred to in some embodiments herein as a "RAID array."

The RAID arrangement 107 in this embodiment illustratively includes an array of n different "disks" denoted 1 through n, each a different physical storage device of the storage devices 106. Multiple such physical storage devices are typically utilized to store data of a given LUN or other logical storage volume in the storage system 102. For example, data pages or other data blocks of a given LUN or other logical storage volume can be "striped" along with its corresponding parity information across multiple ones of the disks in the RAID arrangement 107 in accordance with RAID 5 or RAID 6 techniques.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the disks to collectively provide a diagonal-based configuration for the p and q parity information, so as to support the above-noted double distributed parity and its associated fault tolerance.

As mentioned previously, conventional RAID techniques of this type can be problematic when applied to storage systems with mixed-capacity storage devices, in that such techniques are usually tailored to storage systems in which all of the storage devices over which the data is distributed have the same storage capacity. Adapting such techniques to storage systems such as storage system 102 that include mixed-capacity storage devices 106 can cause bottlenecks on particular storage devices, leading to degraded read performance as well as undue lengthening of the duration of the rebuild process.

It is important to note in this regard that parity blocks are typically not read unless needed for a rebuild process triggered by one or more storage device failures. However, in a conventional mixed-capacity RAID arrangement, the higher-capacity devices will typically contain substantially more data blocks than the lower-capacity devices, and will therefore have a higher IO processing load and correspondingly reduced performance relative to the lower-capacity devices. This performance degradation can be even more severe than may be expected because any stripe read that has even a single data block on a higher-capacity device will slow that entire read. Similar adverse performance impacts can occur for writes in conventional mixed-capacity RAID arrangements.

The storage system 102 overcomes these and other drawbacks of conventional practice by implementing techniques for efficient parity and data distribution for RAID arrangements utilizing mixed-capacity storage devices. For example, as will be described in more detail below, the RAID arrangement 107 is illustratively configured such that data blocks of RAID stripes are allocated to storage devices of a mixed-capacity RAID group in a manner that balances the amount of data across both lower-capacity and higher-capacity storage devices, while parity blocks are concentrated on the higher-capacity storage devices using their respective remaining capacities not already allocated for data blocks. Such arrangements illustratively place the same or similar amounts of data on each of the storage devices of the mixed-capacity RAID group, including both lower-capacity and higher-capacity storage devices, while using the higher-capacity storage devices to hold all or most of the parity blocks. The lower-capacity storage devices may therefore contain no parity blocks, or only a relatively small number of parity blocks. This alleviates bottlenecks at particular storage devices, leading to improved read performance and reduced rebuild time.

The storage controller 108 of storage system 102 comprises stripe configuration logic 112, parity computation logic 114, and device rebuild logic 116. The stripe configuration logic 112 determines an appropriate stripe configuration and a distribution of stripe portions across the storage devices 106 for a given RAID arrangement. The parity computation logic 114 performs parity computations of various RAID arrangements, such as p parity computations of RAID 5, and/or p and q parity computations of RAID 6, using well-known techniques. The device rebuild logic 116 is configured to control the performance of a RAID rebuild process in the storage system 102, as will be described in more detail elsewhere herein.

As noted above, the storage system 102 in this embodiment implements functionality for efficient data and parity distribution across mixed-capacity storage devices. This illustratively includes the performance of a process for efficient data and parity distribution across mixed-capacity storage devices in the storage system 102, such as the example process to be described below in conjunction with FIG. 2.

References herein to "efficient data and parity distribution across mixed-capacity storage devices" are intended to be broadly construed, so as to encompass various types of RAID arrangements in which parity blocks are concentrated on higher-capacity storage devices of a storage system that includes mixed-capacity storage devices.

In operation, the storage controller 108 via its stripe configuration logic 112 establishes a RAID arrangement comprising a plurality of stripes each having multiple portions distributed across multiple ones of the storage devices 106. Examples include the RAID arrangement 107, and the additional RAID arrangements to be described below in conjunction with FIGS. 3 and 4. As mentioned previously, a given RAID 5 or RAID 6 arrangement provides redundancy that supports recovery from failure of a single one of the storage devices 106, or simultaneous failure of two of the storage devices 106, respectively. Other types of RAID arrangements can be used in other embodiments, including other RAID arrangements each supporting at least one recovery option for reconstructing data blocks of at least one of the storage devices 106 responsive to a failure of that storage device.

The stripe portions of each of the stripes illustratively comprise a plurality of data blocks and one or more corresponding parity blocks. The data and parity blocks are also referred to herein as "chunklets" of a RAID stripe, and such blocks or chunklets are examples of what are more generally referred to herein as "stripe portions." In the case of RAID 5, the parity blocks or parity chunklets illustratively comprise row parity or p parity blocks, and are generated by parity computation logic 114 using well-known RAID 5 techniques. In the case of RAID 6, the parity blocks or parity chunklets illustratively comprise row parity or p parity blocks and diagonal parity or q parity blocks, and are generated by parity computation logic 114 using well-known RAID 6 techniques.

The storage controller 108 utilizes its stripe configuration logic 112 to establish a RAID arrangement comprising a plurality of stripes, with each of the plurality of stripes comprising a plurality of data blocks and one or more corresponding parity blocks, the data blocks and parity blocks being distributed across multiple ones of the storage devices 106 of a mixed-capacity RAID group.

In conjunction with establishment of the RAID arrangement, the storage controller 108 is further configured to concentrate storage of the parity blocks in the one or more storage devices of the mixed-capacity RAID group that have the relatively high capacities, such as devices n−1 and n of the RAID arrangement 107. Other storage devices of the RAID arrangement 107, such as devices 1, 2 and 3, have relatively low capacities, compared to the relatively high capacity devices n−1 and n.

For example, assuming that the mixed-capacity RAID group of the RAID arrangement 107 includes at least a first set of storage devices including devices 1, 2 and 3 each having a first capacity and a second set of storage devices including devices n−1 and n each having a second capacity higher than the first capacity, concentrating storage of the parity blocks in the one or more storage devices having the relatively high capacities illustratively comprises concentrating storage of the parity blocks in the second set of storage devices each having the second capacity higher than the first capacity.

Although some embodiments herein make reference to at least two different capacity levels, for respective first and second sets each including one or more storage devices, it should be appreciated that any number of different capacity levels can be supported across the mixed-capacity storage devices in these and other embodiments. For example, in an arrangement with n=5 storage devices, the mixed capacities of storage devices 1, 2, 3, 4 and 5 can be 1.2 TB, 1.8 TB, 2 TB, 3 TB and 3.1 TB, respectively. Thus, each storage device in a given set of multiple storage devices can have a different capacity. A wide variety of alternative arrangements of different mixed-capacity storage devices can be used in illustrative embodiments herein, and the disclosed techniques are not limited in this regard.

In some embodiments, concentrating storage of the parity blocks in the second set of storage devices may comprise storing the parity blocks exclusively in the second set of storage devices, such that none of the parity blocks are stored in the first set of storage devices. An example of an arrangement of this type is the balanced data arrangement shown at the right side of FIG. 3, in which n=8 and each of the first and second sets of storage devices comprises four devices. In such a balanced data arrangement, the same number of data blocks are illustratively stored in each of the storage devices of the first and second sets of storage devices. As a result, the number of data blocks stored in each of the devices 1 through 8 for the RAID stripes of the RAID group is the same in this particular embodiment.

Additionally or alternatively, concentrating storage of the parity blocks in the second set of storage devices each having the second capacity higher than the first capacity may comprise storing the parity blocks such that at least a subset of the storage devices of the first set do not contain any parity blocks but instead contain only data blocks. This is also illustrated in the balanced data arrangement of the right side of FIG. 3, where devices 1, 2, 3 and 4 do not contain any parity blocks, but the parity blocks are instead concentrated exclusively in the higher-capacity storage devices 5, 6, 7 and 8 as shown.

Figure 3:
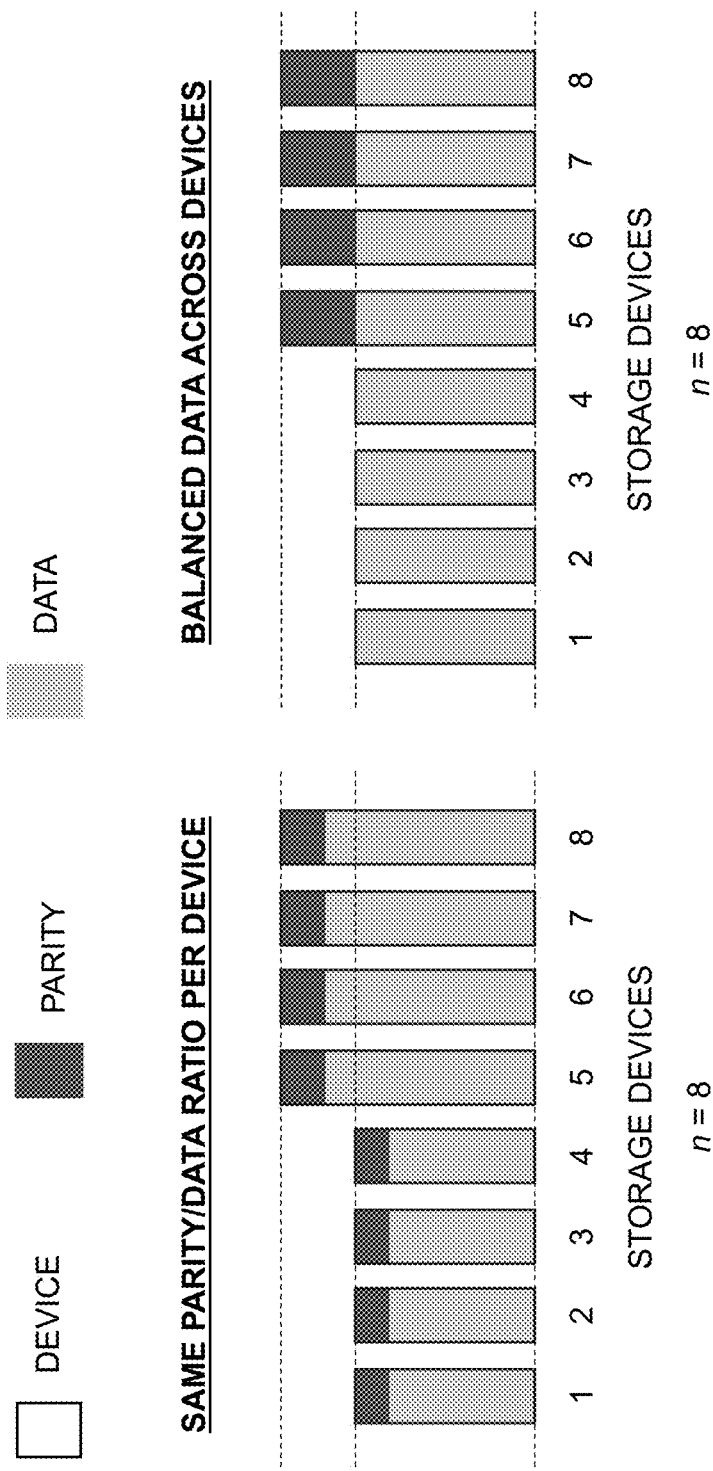
FIG. 3 compares different data and parity distributions across a set of eight mixed-capacity storage devices in an illustrative embodiment.

An arrangement of the type shown at the right side of FIG. 3 is also an example of an arrangement in which concentrating storage of the parity blocks in the second set of storage devices comprises storing the parity blocks such that the storage devices of the first set each have a lower ratio of number of parity blocks to number of data blocks than the storage devices of the second set. For example, for devices 1, 2, 3 and 4, the ratio of parity blocks to data blocks is zero, as these devices do not include any parity blocks, while the devices 5, 6, 7 and 8 have higher ratios of parity blocks to data blocks, as storage of the parity blocks in this particular embodiment is concentrated in those devices.

This is in contrast to an arrangement in which the data blocks and parity blocks are stored across the storage devices of the mixed-capacity RAID group using the same parity/data ratio per device, as illustrated by the arrangement shown at the left side of FIG. 3.

As will be described in more detail elsewhere herein, the balanced data arrangement at the right side of FIG. 3 advantageously reduces an average read latency for reading data blocks of the storage devices, relative to an average read latency that would otherwise result if the storage devices of the first set each had the same ratio of number of parity blocks to number of data blocks as the storage devices of the second set, as in the same parity/data ratio per device arrangement at the left side of FIG. 3.

In addition, the balanced data arrangement at the right side of FIG. 3 advantageously reduces a rebuild time for reconstructing data blocks of at least one of the storage devices responsive to a failure of that storage device, relative to a rebuild time that would otherwise result if the storage devices of the first set each had the same ratio of number of parity blocks to number of data blocks as the storage devices of the second set, as in the same parity/data ratio per device arrangement at the left side of FIG. 3.

It is to be appreciated that the particular RAID arrangements illustrated in FIGS. 1 and 3 and described above are examples only, and should not be viewed as limiting in any way. A wide variety of other RAID arrangements may be configured in which storage of the parity blocks is concentrated on the relatively high capacity devices of a mixed-capacity RAID group. Terms such as "concentrating storage of parity blocks in one or more storage devices having relatively high capacities" as used herein are intended to be broadly construed, so as to encompass, for example, balanced data arrangements such as that shown at the right side of FIG. 3, and other arrangements in which the higher-capacity storage devices have relatively high ratios of parity blocks to data blocks, relative to the lower-capacity storage devices. Such terms are intended to exclude arrangements that utilize the same parity/data ratio per device, as in the example arrangement at the left side of FIG. 3.

The storage controller 108 is further configured to detect a failure of at least one of the storage devices of the RAID arrangement, and responsive to the detected failure, to reconstruct data blocks of that storage device utilizing the data blocks and parity blocks stored on other ones of the storage devices. This reconstruction utilizes what is referred to herein as a "rebuild process" to reconstruct the data blocks of the failed storage device based on data blocks and parity blocks of the remaining storage devices of the RAID arrangement. The failure illustratively comprises a full or partial failure of one or more of the storage devices 106 in a RAID group of the RAID arrangement 107. A "remaining storage device" as that term is broadly used herein refers to a storage device that is not currently experiencing a failure. Thus, all of the storage devices of the RAID group other than the one or more storage devices for which a failure was detected are considered remaining storage devices of the RAID group. Such remaining storage devices are also referred to herein as "surviving storage devices," as these storage devices have survived the one or more detected failures.

The storage system 102 rebuilds stripe portions impacted by the one or more detected failures by reconstruction of impacted data blocks and parity blocks using non-impacted data blocks and parity blocks, using well-known techniques, such as the RAID 5 or RAID 6 techniques mentioned previously. This rebuild process continues until all of the stripe portions of the impacted stripes are fully rebuilt.

Numerous other types of RAID implementations can be used in illustrative embodiments herein, as will be appreciated by those skilled in the art, possibly using error correcting codes such as Reed Solomon codes or other types of codes that are known to those skilled in the art. The term "parity" as used herein is therefore intended to be broadly construed, so as to encompass these and other types of information suitable for use in recovering from at least one failure in at least one storage device.

Additional details regarding examples of techniques for storing data in RAID arrays such as the RAID arrangement 107 of the FIG. 1 embodiment are disclosed in U.S. Pat. No. 9,552,258, entitled "Method and System for Storing Data in RAID Memory Devices," and U.S. Pat. No. 9,891,994, entitled "Updated RAID 6 Implementation," each incorporated by reference herein. For example, these patents provide example techniques for computing parity blocks and performing rebuild processes using such parity blocks, although numerous other known techniques can be used.

In some embodiments, establishing a RAID arrangement in which storage of parity blocks is concentrated in the higher-capacity storage devices comprises executing an algorithm to determine placement of the data blocks and the parity blocks across the multiple ones of the storage devices.

Such an algorithm is illustratively executed by the stripe configuration logic 112 and the parity computation logic 114 of the storage controller 108, and may include, for example, a first phase to allocate data blocks across the multiple storage devices of a mixed-capacity RAID group, and a second phase to allocate parity blocks across at least a subset of the multiple storage devices of the mixed-capacity RAID group using capacity remaining on those storage devices after allocation of data blocks to those storage devices.

As a more particular example, the first phase of the algorithm may comprise the following steps:

1. Initializing an amount of allocated data for each storage device to zero.

2. Initializing a total remaining data capacity to a collective data capacity of the plurality of storage devices, the collective data capacity comprising a total capacity of the storage devices less a desired parity capacity of the storage devices.

3. Initializing a set of remaining storage devices to include all of the storage devices.

4. For each storage device in the set of remaining storage devices, proceeding in an order from a storage device having a lowest capacity to a storage device having a highest capacity until all data blocks are allocated to storage devices:

(a) responsive to the storage device having capacity sufficient to store an amount of data given by the total remaining data capacity divided by the number of storage devices in the set of remaining storage devices, allocating that amount of data to each of the storage devices in the set of remaining storage devices; and (b) otherwise allocating an amount of data given by remaining capacity of the storage device to that storage device and to all other storage devices in the set of remaining storage devices, subtracting the allocated amounts of data from the total remaining data capacity, and removing the storage device and any other storage devices with no remaining capacity from the set of remaining storage devices.

An example of the second phase of the algorithm more particularly includes the following steps:

1. Determining remaining capacity for each of the storage devices.
2. Allocating parity blocks to the storage devices using their respective remaining capacities.

Step 2 of the second phase of the algorithm above can more particularly comprise determining for each of at least a subset of the storage devices a corresponding current utilization of its available parity capacity, and allocating parity blocks to particular ones of the storage devices based at least in part on the current utilizations of their respective available parity capacities. In such an arrangement, a storage device having a relatively low current utilization of its available parity capacity is prioritized over another storage device having a relatively high current utilization of its available parity capacity in the allocating of parity blocks to particular ones of the storage devices.

A more detailed example of the above algorithm for determining a distribution of data blocks and parity blocks in which the parity blocks are concentrated on the higher-capacity devices will now be described.

It is assumed in this example that the RAID arrangement comprises n devices, as in the arrangements previously described in conjunction with FIGS. 1 and 3. The RAID arrangement is assumed to be a single-parity arrangement, illustratively a RAID 5 arrangement, such that the fraction of total capacity used for parity is 1/n, and the fraction of total capacity used for data is 1−1/n. The algorithm in the present example generally attempts to balance the 1−1/n data fraction evenly across the n devices to the greatest extent possible, although a fully balanced distribution may not be achievable, possibly due to the presence of one or more storage devices that are too small to store the minimum fully balanced portion.

In other embodiments, other RAID arrangements may be used, including, for example, a double-parity arrangement such as RAID 6, in which case the fraction of total capacity used for parity is 2/n, and the fraction of total capacity used for data is 1−2/n. These and other references herein to RAID 5 and RAID 6 are only examples, and numerous other RAID arrangements can be used in other embodiments.

The algorithm in this example includes the following steps, illustratively performed by the storage controller 108 of the storage system 102:

1. Based on the capacity of the devices, calculate the intended amount of data and parity for each device as follows:
   a. Data
   i. Initialize the amount of data, dev_data, of each device to 0.
   ii. Initialize the total remaining capacity to the data capacity of all the devices (1−1/n of the total capacity).
   iii. Initialize the set of remaining_devices to contain all n devices.
   iv. For each device in remaining_devices, from the smallest to largest device:
      1. If device is large enough to hold remaining_capacity/ |remaining_devices|, add remaining capacity/|remaining_devices| to dev_data of each device in remaining_devices.
      2. Otherwise, add remaining capacity in device to dev_data of all remaining_devices, subtract remaining capacity in device*|remaining_devices| from remaining_capacity, and remove device from remaining_devices.

b. Parity
   i. The parity uses the capacity remaining on each device. Assuming the device capacity is dev_capacity, the capacity for parity is dev_parity=dev_capacity−dev_data. The amount of the parity capacity dev_parity that is actually used is denoted dev_used_parity.

2. Maintain a metadata structure per device that stores the device's capacity (dev_capacity), the amount of data the device contains (dev_data), and the amount of parity data the device contains (dev_used_parity). Such metadata structures are illustratively stored in a memory within or otherwise accessible to the storage controller 108.

3. When choosing a device for a parity block, select the device that has the lowest utilization of parity space: min (dev_used_parity/dev_parity), for devices with dev_parity>0.

It is to be appreciated that this particular algorithm, like others described herein, is presented by way of illustrative example only, and can be varied in other embodiments. For example, certain steps can be performed at least in part in parallel with other steps in other embodiments. Also, additional or alternative steps can be used in other embodiments, as well as different RAID arrangements.

The performance benefits attributable to use of techniques disclosed herein in some embodiments depend on factors such as the amount of parity and the relative capacities of the storage devices of the mixed-capacity RAID group.

For example, the performance benefit attributable to use of the particular example algorithm just described can be estimated in the following manner. First, these assumptions are made:

1. A configuration of n devices.
2. The number of data blocks per stripe is k (out of n).
3. The largest device has a capacity that is d times the capacity of the smallest device.
4. The capacity of the largest device is $C_{max}$ and the capacity of the smallest device is $C_{min}$.
5. The individual capacities of the n devices are given by $C_i$, i=1, 2, . . . n.

In a RAID arrangement that uses the same parity/data ratio per device, such as the arrangement shown at the left side of FIG. 3, the performance is bounded by the largest device that is working the hardest. All the other devices will be underutilized, attaining a performance utilization of only $$\frac{C_i}{C_{max}}.$$

Total performance utilization will be $$\frac{\sum_{i=0}^{n} C_i}{nC_{max}}.$$

Note that when each of the n devices has the maximum capacity $C_{max}$, such that for all i, $$C_i = C_{max}, \frac{\sum_{i=0}^{n} C_i}{nC_{max}} = 1$$

so mere is no performance benefit to be gained.

The attainable performance benefit therefore depends on the capacity difference between the devices, as indicated previously. If the additional capacity of the larger devices is smaller than the size of the parity, all devices will have the same amount of data and performance will be balanced:

$$\frac{\sum_{i=0}^{n} C_i}{nC_{min}} \leq \frac{n}{k}, \text{Utilization} = 1$$

When the extra capacity on the larger devices is larger than all the parity, some imbalance will remain depending on the relative capacities of the devices.

In the mixed-capacity RAID group illustrated at the right side of FIG. 3, there are 8 devices with 2 capacity levels, and 4 devices in each level. The data is balanced evenly across the eight devices, and the parity is concentrated in the higher-capacity devices 5, 6, 7 and 8, as previously described herein. This example shows a case in which the data fraction given by 1−1/n of the total capacity was evenly balanced across all of the n=8 devices. This type of arrangement provides significant performance advantages along the lines described above, relative to an arrangement such as that shown at the left side of FIG. 3, in which the same or similar parity/data ratio is used on each of the devices.

FIG. 4 shows a table providing additional examples of different data and parity distributions across different sets of mixed-capacity storage devices in illustrative embodiments, showing performance improvements achievable using the techniques disclosed herein. Three different RAID arrangements correspond to respective rows of the table, with different values of n and k, and different capacity differences between the devices, in each such scenario. In the first two rows, RAID 5 arrangements are used, with n=4 and k=3, while in the third row, a RAID 6 arrangement is used, with n=6 and k=4.

The first column of the table provides the details of the three different example scenarios, including the values of n and k and the device capacities for each scenario. The second column shows the amount of data on each device and the corresponding performance utilization, for each of the three scenarios, assuming a conventional rotation distribution that achieves the same or similar parity/data ratio per device. Finally, the third column shows the amount of the data on each device and the corresponding performance utilization, for each of the three scenarios, utilizing a data balancing approach of the type disclosed herein.

It is apparent from the examples of FIG. 4 that substantial increases in performance utilization are achieved for each of the three scenarios when using a data balancing approach of the type disclosed herein. More particularly, performance utilization in the first scenario is increased from 83% to 100%, in the second scenario from 75% to 90%, and in the third scenario from 41.67% to 100%. Similar performance advantages are achievable in other illustrative embodiments disclosed herein.

These and other embodiments can also provide a significant reduction in RAID rebuild time. During a rebuild process, all the data blocks are read, but the number of parity blocks to be read depends on the number of failed devices and on the RAID arrangement. For example, RAID 6 utilizes two parity blocks per stripe but only one of those blocks for each stripe is required to recover from a single device failure. Since the larger devices contain more of the parity, and at least some of the parity will not need to be read, the IO load on the devices is more balanced than in the case of the same parity/data ratio distribution, thereby shortening the amount of time required for a RAID rebuild. This shorter rebuild time directly improves the resiliency of the storage system to failures.

It should be noted that write performance for full stripe writes are not adversely impacted by the disclosed data balancing techniques. However, the write performance of small writes for less than a full stripe can in some embodiments exhibit somewhat worse performance than in the case of the same parity/data ratio distribution, because many parity updates will be focused on the larger devices.

Nonetheless, the disclosed data balancing techniques generally provide an overall benefit to storage system performance in illustrative embodiments. This is due at least in part to the fact that in many storage systems, reads are much more common than writes (e.g., typically 70% reads, 30% writes) and therefore read performance is more heavily weighted in overall system performance than write performance. Also, in many storage systems, read latency is much more influential than write latency because host writes are typically acknowledged quickly from an upper layer (e.g., a write cache above the RAID layer) as opposed to host reads that must wait for the RAID layer operations to complete. Finally, some storage systems, such as Log Structured Array (LSA) storage systems, are designed to perform full stripe writes even when user data writes are not full stripe writes. Since almost all writes to RAID stripes in such systems are full stripe writes, illustrative embodiments of this type suffer no disadvantage on writes and still provide all the described benefits for read and rebuild.

As indicated previously, the above-described techniques relating to efficient data and parity distribution across mixed-capacity storage devices in the storage system 102 are illustratively implemented at least in part by the storage controller 108, utilizing its stripe configuration logic 112 and parity computation logic 114. A rebuild process utilizing data blocks and parity blocks to recover from one or more storage device failures is illustratively implemented at least in part by the storage controller 108, utilizing its device rebuild logic 116.

The storage controller 108 and the storage system 102 may further include one or more additional modules and other components typically found in conventional implementations of storage controllers and storage systems, although such additional modules and other components are omitted from the figure for clarity and simplicity of illustration.

The storage system 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

A mixed-capacity RAID group in some embodiments is established for a particular one of the storage nodes of a distributed implementation of storage system 102. The storage devices associated with the particular one of the storage nodes are illustratively part of a DAE of that storage node, although other storage device arrangements are possible. Each such storage device illustratively comprises an SSD, HDD or other type of storage drive. Similar arrangements can be implemented for each of one or more other ones of the storage nodes, although distributed implementations using multiple storage nodes are not required.

The storage system 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 may be implemented in whole or in part on the same processing platform as the storage system 102 or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 101 and the storage system 102 to reside in different data centers. Numerous other distributed implementations of the host devices and the storage system 102 are possible.

Additional examples of processing platforms utilized to implement host devices 101 and storage system 102 in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 101, storage system 102, network 104, storage devices 106, RAID arrangement 107, storage controller 108, stripe configuration logic 112, parity computation logic 114, and device rebuild logic 116 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in further detail with reference to the flow diagram of the illustrative embodiment of FIG. 2, which implements a process for efficient data and parity distribution across mixed-capacity storage devices in the storage system 102. The process illustratively comprises an algorithm implemented at least in part by the storage controller 108 and one or more of its logic instances 112, 114 and 116. As noted above, the storage devices 106 in some embodiments are more particularly referred to as "drives" and may comprise, for example, SSDs, HDDs, hybrid drives or other types of drives. A plurality of mixed-capacity storage devices over which a given RAID arrangement is implemented illustratively comprises what is generally referred to herein as a mixed-capacity RAID group.

Figure 2:
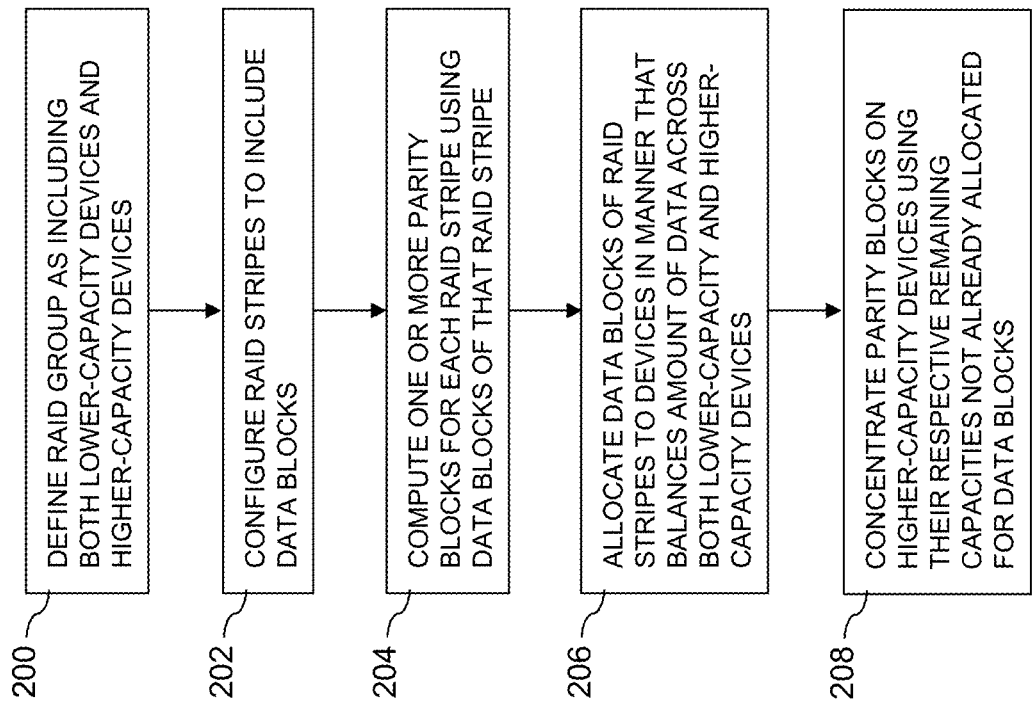
FIG. 2 is a flow diagram of a process for efficient data and parity distribution across mixed-capacity storage devices in an illustrative embodiment.

The process as illustrated in FIG. 2 includes steps 200 through 208, and is described in the context of storage system 102 but is more generally applicable to a wide variety of other types of storage systems each comprising mixed-capacity storage devices. The process is illustratively performed under the control of the storage controller 108, utilizing stripe configuration logic 112 and parity computation logic 114. Thus, the FIG. 2 process can be viewed as an example of an algorithm collectively performed by the logic instances 112 and 114. Other examples of such algorithms implemented by a storage controller or other storage system components will be described elsewhere herein.

In step 200, the storage system 102 defines a mixed-capacity RAID group as including both lower-capacity devices and higher-capacity devices within the storage devices 106 of the storage system 102. An example of such a mixed-capacity RAID group is that illustrated in the RAID arrangement 107 of FIG. 1. Other examples are described below and elsewhere herein in conjunction with the illustrative embodiments of FIGS. 3 and 4.

In step 202, each of a plurality of RAID stripes of the RAID group is configured to include a plurality of data blocks. Stripe arrangements are illustratively configured using stripe configuration logic 112 of storage controller 108.

In step 204, one or more parity blocks are computed for each RAID stripe using data blocks of that RAID stripe. Parity blocks are illustratively computed using parity computation logic 114 of storage controller 108.

In step 206, data blocks of the RAID stripes are allocated to the storage devices in a manner that balances the amount of data across both lower-capacity and higher-capacity devices. For example, with reference to the arrangement at the right side of FIG. 3, each of the n=8 devices illustratively includes substantially the same number of data blocks, such that the amount of data is balanced across the devices.

In step 208, the parity blocks are concentrated on the higher-capacity devices using their respective remaining capacities not already allocated for data blocks. For example, again with reference to the arrangement at the right side of FIG. 3, the parity blocks are concentrated on the higher-capacity devices 5, 6, 7 and 8, and more particularly may be stored exclusively on those higher-capacity devices, such that no parity blocks are stored on the lower-capacity devices 1, 2, 3 and 4. This illustrative arrangement of FIG. 3 is only an example, and numerous other arrangements for concentrating storage of parity blocks on higher-capacity devices of a mixed-capacity RAID group may be used in other embodiments. As indicated previously, there may be more than two different capacity levels, as in an arrangement such as that described elsewhere herein in which each of the storage devices has a different capacity.

The steps are shown in sequential order for clarity and simplicity of illustration only, and certain steps can at least partially overlap with other steps. For example, the allocation of data blocks in step 206 and the concentrating of parity blocks in step 208 can be performed at least in part in conjunction with respective steps 202 and 204.

Different instances of the process of FIG. 2 can be performed for different portions of the storage system 102, such as different storage nodes of a distributed implementation of the storage system 102.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for efficient data and parity distribution across mixed-capacity storage devices in a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for efficient data and parity distribution across mixed-capacity storage devices for respective different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 in storage system 102 that is configured to perform the steps of the FIG. 2 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The host devices 101, storage controller 108, as well as other system components, may be implemented at least in part using processing devices of such processing platforms.

The above-described operations associated with efficient data and parity distribution across mixed-capacity storage devices are presented by way of illustrative example only, and should not be viewed as limiting in any way. Additional or alternative operations can be used in other embodiments.

Again, references to "disks" in the context of RAID herein are intended to be broadly construed, and should not be viewed as being limited to disk-based storage devices. For example, the disks may comprise SSDs, although it is to be appreciated that many other storage device types can be used.

Illustrative embodiments of a storage system with functionality for efficient data and parity distribution across mixed-capacity storage devices in a storage system as disclosed herein can provide a number of significant advantages relative to conventional arrangements.

For example, some embodiments provide RAID arrangements in which data blocks of RAID stripes are allocated to storage devices in a manner that balances the amount of data across both lower-capacity and higher-capacity storage devices, while parity blocks are concentrated on the higher-capacity storage devices using their respective remaining capacities not already allocated for data blocks.

Such arrangements in some embodiments illustratively place the same or similar amounts of data on each of the storage devices, including both lower-capacity and higher-capacity storage devices, while using the higher-capacity storage devices to hold all or most of the parity blocks. The lower-capacity storage devices may therefore contain no parity blocks, or only a relatively small number of parity blocks.

These and other embodiments can advantageously alleviate bottlenecks that might otherwise arise at the higher-capacity storage devices, leading to improved read performance and reduced rebuild time.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for efficient data and parity distribution across mixed-capacity storage devices in a storage system will now be described in greater detail with reference to FIGS. 5 and 6. Although described in the context of system 100, these platforms may also be used to implement at least portions of other information processing systems in other embodiments.

Figure 5:
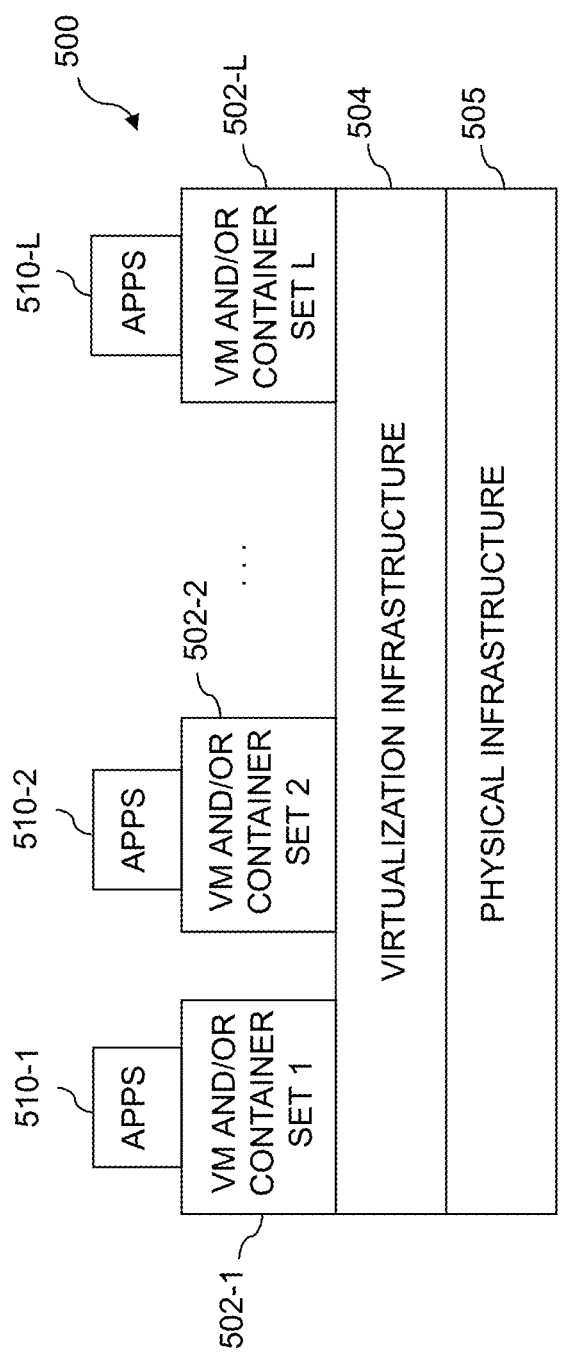
FIGS. 5 and 6 show examples of processing platforms that may be utilized to implement at least a portion of an information processing system in illustrative embodiments.
Figure 6:
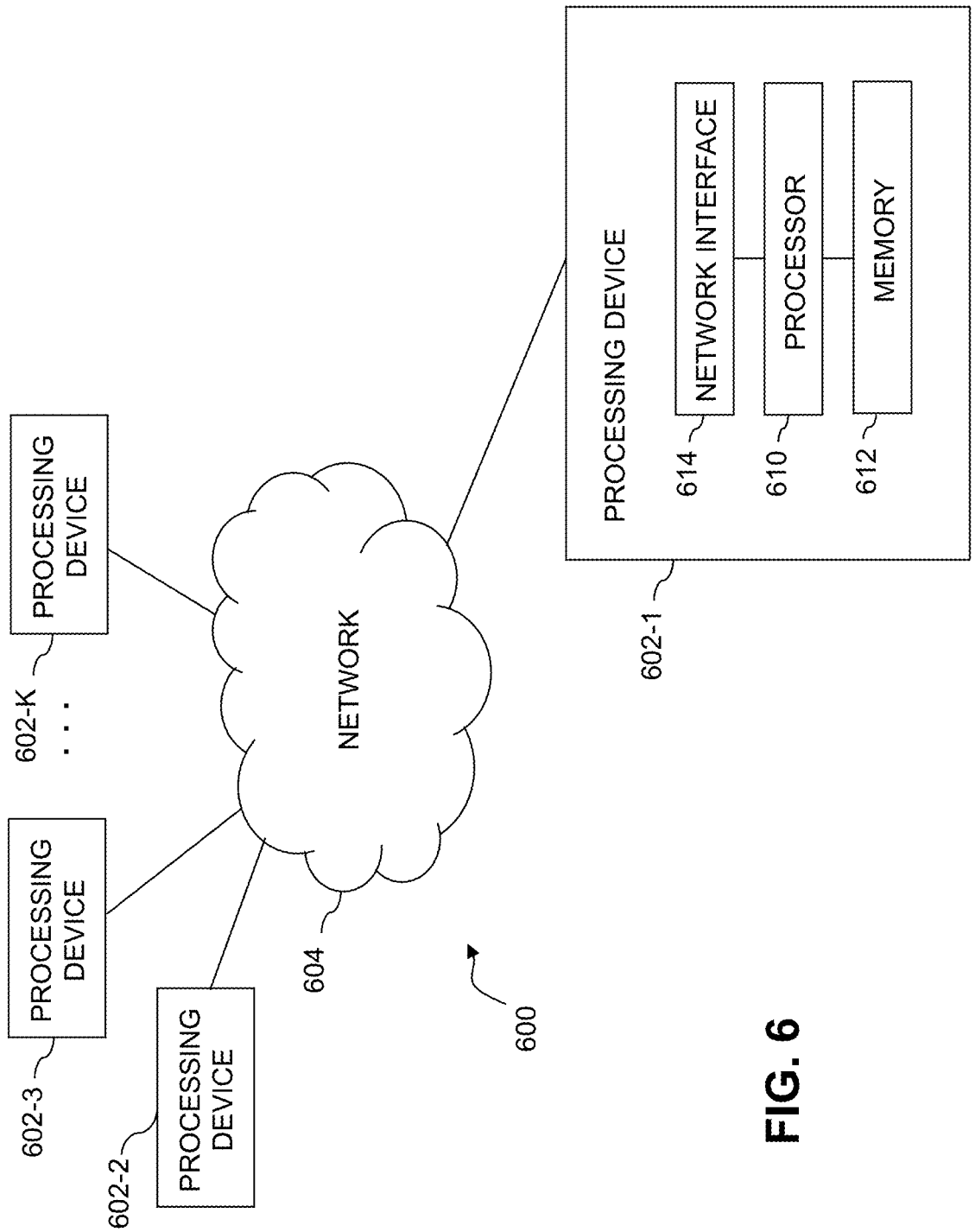

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide at least portions of the functionality described herein using one or more processes running on a given one of the VMs. For example, each of the VMs can implement logic instances and/or other components supporting the disclosed functionality for efficient data and parity distribution across mixed-capacity storage devices in the storage system 102.

A hypervisor platform may be used to implement a hypervisor within the virtualization infrastructure 504. Such a hypervisor platform may comprise an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide at least portions of the functionality described herein. For example, a container host device supporting multiple containers of one or more container sets can implement logic instances and/or other components supporting the disclosed functionality for efficient data and parity distribution across mixed-capacity storage devices in the storage system 102.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for efficient data and parity distribution across mixed-capacity storage devices in a storage system of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage devices, RAID arrangements, storage controllers, stripe configuration logic, parity computation logic, device rebuild logic and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices;
the storage devices comprising at least one or more storage devices having relatively low capacities and one or more storage devices having relatively high capacities;
the storage system being configured:
to establish a redundant array of independent disks (RAID) arrangement comprising a plurality of stripes, with each of the plurality of stripes comprising a plurality of data blocks and one or more corresponding parity blocks, the data blocks and parity blocks being distributed across multiple ones of the storage devices; and
in conjunction with establishment of the RAID arrangement, to concentrate storage of the parity blocks in the one or more storage devices having the relatively high capacities;
wherein the storage devices comprise at least a first set of storage devices each having a first capacity and a second set of storage devices each having a second capacity higher than the first capacity, and wherein concentrating storage of the parity blocks in the one or more storage devices having the relatively high capacities comprises concentrating storage of the parity blocks in the second set of storage devices each having the second capacity higher than the first capacity; and
wherein concentrating storage of the parity blocks in the second set of storage devices comprises storing the parity blocks exclusively in the second set of storage devices, such that none of the parity blocks are stored in the first set of storage devices;
the first set of storage devices thereby storing no parity blocks of the RAID arrangement; and
the second set of storage devices thereby storing all of the parity blocks of the RAID arrangement.

2. The apparatus of claim 1 wherein the RAID arrangement comprises one of a RAID 5 arrangement supporting recovery from a failure of a single one of the plurality of storage devices, and a RAID 6 arrangement supporting recovery from simultaneous failure of up to two of the storage devices.

3. The apparatus of claim 1 wherein the same number of data blocks are stored in each of the storage devices of the first and second sets of storage devices.

4. The apparatus of claim 1 wherein an average read latency for reading data blocks of the storage devices is reduced by the concentrating relative to an average read latency that would otherwise result if the storage devices of the first set each had the same ratio of number of parity blocks to number of data blocks as the storage devices of the second set.

5. The apparatus of claim 1 wherein a rebuild time for reconstructing data blocks of at least one of the storage devices responsive to a failure of that storage device is reduced by the concentrating relative to a rebuild time that would otherwise result if the storage devices of the first set each had the same ratio of number of parity blocks to number of data blocks as the storage devices of the second set.

6. The apparatus of claim 1 wherein establishing the RAID arrangement comprises executing an algorithm to determine placement of the data blocks and the parity blocks across the multiple ones of the storage devices, the algorithm comprising:
a first phase to allocate data blocks across the multiple storage devices; and
a second phase to allocate parity blocks across at least a subset of the multiple storage devices using capacity remaining on those storage devices after allocation of data blocks to those storage devices.

7. An apparatus comprising:
a storage system comprising a plurality of storage devices;
the storage devices comprising at least one or more storage devices having relatively low capacities and one or more storage devices having relatively high capacities;
the storage system being configured:
to establish a redundant array of independent disks (RAID) arrangement comprising a plurality of stripes, with each of the plurality of stripes comprising a plurality of data blocks and one or more corresponding parity blocks, the data blocks and parity blocks being distributed across multiple ones of the storage devices; and
in conjunction with establishment of the RAID arrangement, to concentrate storage of the parity blocks in the one or more storage devices having the relatively high capacities;
wherein establishing the RAID arrangement comprises executing an algorithm to determine placement of the data blocks and the parity blocks across the multiple ones of the storage devices, the algorithm comprising:
a first phase to allocate data blocks across the multiple storage devices; and
a second phase to allocate parity blocks across at least a subset of the multiple storage devices using capacity remaining on those storage devices after allocation of data blocks to those storage devices; and
wherein the first phase of the algorithm comprises:
initializing an amount of allocated data for each storage device to zero;
initializing a total remaining data capacity to a collective data capacity of the plurality of storage devices, the collective data capacity comprising a total capacity of the storage devices less a desired parity capacity of the storage devices;
initializing a set of remaining storage devices to include all of the storage devices; and
for each storage device in the set of remaining storage devices, proceeding in an order from a storage device having a lowest capacity to a storage device having a highest capacity until all data blocks are allocated to storage devices;

responsive to the storage device having capacity sufficient to store an amount of data given by the total remaining data capacity divided by the number of storage devices in the set of remaining storage devices, allocating that amount of data to each of the storage devices in the set of remaining storage devices; and otherwise allocating an amount of data given by remaining capacity of the storage device to that storage device and to all other storage devices in the set of remaining storage devices, subtracting the allocated amounts of data from the total remaining data capacity, and removing the storage device and any other storage devices with no remaining capacity from the set of remaining storage devices.

8. The apparatus of claim 6 wherein the second phase of the algorithm comprises:

determining remaining capacity for each of the storage devices; and allocating parity blocks to the storage devices using their respective remaining capacities.

9. An apparatus comprising:

a storage system comprising a plurality of storage devices;

the storage devices comprising at least one or more storage devices having relatively low capacities and one or more storage devices having relatively high capacities;

the storage system being configured:

to establish a redundant array of independent disks (RAID) arrangement comprising a plurality of stripes, with each of the plurality of stripes comprising a plurality of data blocks and one or more corresponding parity blocks, the data blocks and parity blocks being distributed across multiple ones of the storage devices; and in conjunction with establishment of the RAID arrangement, to concentrate storage of the parity blocks in the one or more storage devices having the relatively high capacities;

wherein establishing the RAID arrangement comprises executing an algorithm to determine placement of the data blocks and the parity blocks across the multiple ones of the storage devices, the algorithm comprising:

a first phase to allocate data blocks across the multiple storage devices; and a second phase to allocate parity blocks across at least a subset of the multiple storage devices using capacity remaining on those storage devices after allocation of data blocks to those storage devices;

wherein the second phase of the algorithm comprises:

determining remaining capacity for each of the storage devices; and allocating parity blocks to the storage devices using their respective remaining capacities; and wherein allocating parity blocks to the storage devices comprises:

determining for each of at least a subset of the storage devices a corresponding current utilization of its available parity capacity; and allocating parity blocks to particular ones of the storage devices based at least in part on the current utilizations of their respective available parity capacities;

wherein a storage device having a relatively low current utilization of its available parity capacity is prioritized over another storage device having a relatively high current utilization of its available parity capacity in the allocating of parity blocks to particular ones of the storage devices.

10. The apparatus of claim 1 wherein the storage system is further configured:

to detect a failure of at least one of the storage devices; and responsive to the detected failure, to reconstruct data blocks of that storage device utilizing the data blocks and parity blocks stored on other ones of the storage devices.

11. A method for use in a storage system comprising a plurality of storage devices, the storage devices comprising at least one or more storage devices having relatively low capacities and one or more storage devices having relatively high capacities, the method comprising:

establishing a redundant array of independent disks (RAID) arrangement comprising a plurality of stripes, with each of the plurality of stripes comprising a plurality of data blocks and one or more corresponding parity blocks, the data blocks and parity blocks being distributed across multiple ones of the storage devices; and in conjunction with establishment of the RAID arrangement, concentrating storage of the parity blocks in the one or more storage devices having the relatively high capacities;

wherein the storage devices comprise at least a first set of storage devices each having a first capacity and a second set of storage devices each having a second capacity higher than the first capacity, and wherein concentrating storage of the parity blocks in the one or more storage devices having the relatively high capacities comprises concentrating storage of the parity blocks in the second set of storage devices each having the second capacity higher than the first capacity; and wherein concentrating storage of the parity blocks in the second set of storage devices comprises storing the parity blocks exclusively in the second set of storage devices, such that none of the parity blocks are stored in the first set of storage devices;

the first set of storage devices thereby storing no parity blocks of the RAID arrangement; and the second set of storage devices thereby storing all of the parity blocks of the RAID arrangement.

12. A computer program product comprising a non-transitory processor-readable storage medium having stored therein program code of one or more software programs, wherein the program code when executed by a processor of a storage system comprising a plurality of storage devices, the storage devices comprising at least one or more storage devices having relatively low capacities and one or more storage devices having relatively high capacities, causes the storage system:

to establish a redundant array of independent disks (RAID) arrangement comprising a plurality of stripes, with each of the plurality of stripes comprising a plurality of data blocks and one or more corresponding parity blocks, the data blocks and parity blocks being distributed across multiple ones of the storage devices; and in conjunction with establishment of the RAID arrangement, to concentrate storage of the parity blocks in the one or more storage devices having the relatively high capacities;

wherein the storage devices comprise at least a first set of storage devices each having a first capacity and a second set of storage devices each having a second capacity higher than the first capacity, and wherein concentrating storage of the parity blocks in the one or more storage devices having the relatively high capacities comprises concentrating storage of the parity blocks in the second set of storage devices each having the second capacity higher than the first capacity; and wherein concentrating storage of the parity blocks in the second set of storage devices comprises storing the parity blocks exclusively in the second set of storage devices, such that none of the parity blocks are stored in the first set of storage devices;

the first set of storage devices thereby storing no parity blocks of the RAID arrangement; and the second set of storage devices thereby storing all of the parity blocks of the RAID arrangement.

13. The computer program product of claim 12 wherein the same number of data blocks are stored in each of the storage devices of the first and second sets of storage devices.

14. The computer program product of claim 12 wherein an average read latency for reading data blocks of the storage devices is reduced by the concentrating relative to an average read latency that would otherwise result if the storage devices of the first set each had the same ratio of number of parity blocks to number of data blocks as the storage devices of the second set.

15. The computer program product of claim 12 wherein a rebuild time for reconstructing data blocks of at least one of the storage devices responsive to a failure of that storage device is reduced by the concentrating relative to a rebuild time that would otherwise result if the storage devices of the first set each had the same ratio of number of parity blocks to number of data blocks as the storage devices of the second set.

16. The computer program product of claim 12 wherein establishing the RAID arrangement comprises executing an algorithm to determine placement of the data blocks and the parity blocks across the multiple ones of the storage devices, the algorithm comprising:
- a first phase to allocate data blocks across the multiple storage devices; and
- a second phase to allocate parity blocks across at least a subset of the multiple storage devices using capacity remaining on those storage devices after allocation of data blocks to those storage devices.

17. The method of claim 11 wherein the same number of data blocks are stored in each of the storage devices of the first and second sets of storage devices.

18. The method of claim 11 wherein an average read latency for reading data blocks of the storage devices is reduced by the concentrating relative to an average read latency that would otherwise result if the storage devices of the first set each had the same ratio of number of parity blocks to number of data blocks as the storage devices of the second set.

19. The method of claim 11 wherein a rebuild time for reconstructing data blocks of at least one of the storage devices responsive to a failure of that storage device is reduced by the concentrating relative to a rebuild time that would otherwise result if the storage devices of the first set each had the same ratio of number of parity blocks to number of data blocks as the storage devices of the second set.

20. The method of claim 11 wherein establishing the RAID arrangement comprises executing an algorithm to determine placement of the data blocks and the parity blocks across the multiple ones of the storage devices, the algorithm comprising:
- a first phase to allocate data blocks across the multiple storage devices; and
- a second phase to allocate parity blocks across at least a subset of the multiple storage devices using capacity remaining on those storage devices after allocation of data blocks to those storage devices.

* * * * *